United States Patent Office 2,987,509
Patented June 6, 1961

2,987,509
N-VINYL-3-MORPHOLINONE COMPOUNDS

Billy E. Burgert, Midland, Mich., assignor to The Dow Chemical Company, Midland, Mich., a corporation of Delaware
No Drawing. Filed Oct. 28, 1957, Ser. No. 692,587
7 Claims. (Cl. 260—88.3)

The present invention contributes to the organic chemical arts and, more particularly, has reference to N-vinyl-3-morpholinone compounds, including new and useful monoethylenically unsaturated monomeric compounds of the indicated variety and to various derivatives thereof, particularly polymeric and resinous products that have great utility and provide for many benefits and advantages in numerous applications.

One basic object of the invention is to provide, as new compositions of matter, N-vinyl-3-morpholinone compounds that contain the characterizing group:

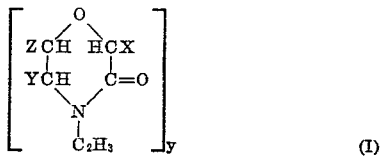

(I)

wherein X, Y and Z are independently selected from the group consisting of hydrogen and lower alkyl radicals, preferably those containing from one to about four carbon atoms, and y is an integer that has a numerical value of at least one, but which may also have a positive value of considerable plurality.

A specific object is to provide monomeric N-vinyl-3-morpholinone compounds of the indicated variety, wherein the N-substituted —C₂H₃ unit is an ethylenically unsaturated vinyl (—CH=CH₂) group and the independent X, Y and Z ring substituents are those described in connection with Formula I, the term y having a numerical value of one.

A further specific object is to provide monomeric N-vinyl-3-morpholinone wherein, according to Formula I, the N-substituted —C₂H₃ unit is a vinyl group and X, Y and Z are each hydrogen.

A further object of considerable importance is to provide polymeric products, including high polymers of considerable ponderosity, particularly homopolymers but inclusive of various copolymeric compositions, that are derived from monomeric N-vinyl-3-morpholinone compounds, especially N-vinyl-3-morpholinone.

According to the present invention, the new monomeric compounds which possibilitate the achievement of the above indicated and corollary objects (including the formation of new polymeric products) is of the general structure:

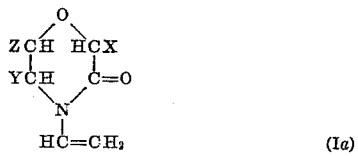

(Ia)

wherein X, Y and Z are as defined in Formula I.

N-vinyl-3-morpholinone in a normally solid, white appearing substance at ordinary room temperatures which melts at 37–39° C. to form a clear, colorless liquid. The monomer is soluble in water, alcohols such as methanol and the like, and certain other organic solvents including dichloromethane, carbon tetrachloride, benzene, dimethyl formamide and the like. The monomeric compound is generally insoluble in such aliphatic liquids as cyclohexane, hexane, octane and the like and in petroleum ether. Under an absolute pressure of about 5 millimeters of mercury, the monomeric liquid boils at a temperature of about 95.0–95.5° C. It has a refractive index, taken at about 40° C., of about 1.5088 and a specific gravity, taken at 40° C. and corrected to 4° C., of about 1.1345 grams per cubic centimeter. Upon infrared spectroscopic analysis, the monomeric compound exhibits the characteristic absorption bands that are obtained when N-vinyl groups and

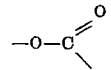

structural formations are present. Ring substituted monomeric N-vinyl-3-morpholinone compounds such as N-vinyl-5-methyl-3-morpholinone; N-vinyl-5-ethyl-3-morpholinone; and the like including the 2-alkyl substituted and 6-alkyl substituted homologues as well as plurally ring substituted N-vinyl-3-morpholinone compounds have properties and characteristics that are generally similar to those of N-vinyl-3-morpholinone, having the deviations that are expectable because of the presence of the various alkyl ring substituents that may be present in their constitution.

The monomeric N-vinyl-3-morpholinone compounds are relatively unstable upon exposure to light, particularly sunlight. Generally, the unstabilized monomers become discolored to a very light shade of yellow within several days or so of continued exposure to light. However, when they are kept in the dark, particularly when they are maintained under an atmosphere of nitrogen, their natural stability is good. Thus, they may be stored safely for prolonged periods when maintained so as to be protected in the indicated manner. The monomeric compounds react with solutions of bromine in chloroform, as evidenced by rapid discoloration of the halogen solution due to the bromination of the vinyl group in the monomer.

The monomeric N-vinyl-3-morpholinone compounds may advantageously be prepared by direct vinylation of a suitable 3-morpholinone compound with acetylene in a manner analogous to that utilized for the vinylation of the various lactams and as hereinafter demonstrated.

The various N-vinyl-3-morpholinone compounds of Formula Ia will undergo polymerization in mass (which is oftentimes referred to as bulk polymerization) as well as polymerization in aqueous or other solution or in emulsion or other dispersion in liquids with which they are not soluble or miscible. The polymerization of the monomer dispersed or dissolved in any polymerization medium, such as a solution of the monomer in water, may be accomplished at any desired concentration of the monomer varying from exceedingly dilute conditions to very great concentrations in polymerization masses which consist substantially entirely of the monomer. It is ordinarily beneficial for the polymerization to be conducted at a temperature that is, say, between about 50 and 100° C., depending somewhat on the particular polymerization technique and the form of catalysis or polymerizing inducement being employed. Suitable catalysts or initiators for polymerization of the monomers, including N-vinyl-3-morpholinone in particular, include the azo catalysts, such as azobisisobutyronitrile, peroxygen catalysts, such as potassium persulfate, and irradiation under the influence of high energy fields. The latter catalyzation may include such diverse forms of high energy radiation as ultraviolet light, X-ray and gamma radiations, as well as radiations from radioactive materials. The monomers will also undergo thermal polymerization without using catalyzing agents or influences by simply heating them in air or, frequently with advantage, under nitrogen, at temperatures of 100° C. or so. Copolymers of the various N-vinyl-3-morpholinone monomers, particularly N-vinyl-3-morpholinone, with other monoethylenically unsaturated monomers as styrene, acrylonitrile, vinyl chloride, methyl methacrylate, vinyl acetate and the like, may be prepared in ways analogous to those described in the foregoing, including suspension and emulsion polymerization techniques. Such copolymers have many desirable and useful properties and characteristics.

Poly-N-vinyl-3-morpholinone compounds, particularly poly-N-vinyl-3-morpholinone, may advantageously be prepared as high polymers having molecular weights, for example, in the range from 10 to 50 thousand and higher (as determinable from such characteristics as Fikentscher K-values of about 5 or 10 to 75 or 100 and more) and a structural arrangement that may be depicted in the following way:

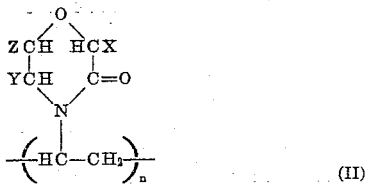

wherein X, Y and Z have the same meanings as set forth for them in connection with Formula I and $n$ is a plural integer, preferably one whose numerical value is greater than 50 and which may be as large as 1,000 or more. Of course, lower molecular weight polymers (including various copolymers) can also be made.

Poly-N-vinyl-3-morpholinone is a white powder having a non-crystalline nature as indicated by X-ray analysis. It is hygroscopic in nature, assimilating, for example, a moisture content of 10 weight percent or more on overnight exposure to a normal atmosphere. It softens in the temperature range from about 180 to 190° C. and fuses at a temperature in the neighborhood of 220° C. The homopolymer of N-vinyl-3-morpholinone can be molded under pressures of 15,000 pounds per square inch (p.s.i.) or so at elevated temperatures of 180° C. or so to produce clear, hard and brittle, glass-like structures having very good adhesiveness to glass and other impervious surfaces, such as those of a ceramic or siliceous nature. It can be precipitated from aqueous solution by addition thereto of such a caustic substance as sodium hydroxide and redissolved subsequent to such precipitation by further dilution with water. The homopolymer is soluble in water, dilute salt solutions of sodium chloride in water and the like, methylene chloride, dimethyl formamide, dimethyl acetamide and similar solvents. It is insoluble in acetone, methanol, ethanol, isopropanol and the like and may be precipitated from aqueous solution by means of such solvents. The properties and characteristics of the various polymers prepared from the ring-substituted N-vinyl-3-morpholinone monomers described in the foregoing are, in general, more or less similar and related to those of poly-N-vinyl-3-morpholinone with the expectable differences due to the presence and specific influencing propensities of the ring substituents being evident therein.

Certain of the properties and characteristics of the N-vinyl-3-morpholinone polymers, particularly poly-N-vinyl-3-morpholinone, are analogous to those of the known polymeric composition, poly - N - vinyl - 2 - pyrrolidone. Among other advantageous uses and properties, for example, the N-vinyl-3-morpholinone polymers, especially poly-N-vinyl-3-morpholinone, are excellent receptors for and binding acceptors of many of a wide variety of dyestuffs. Thus, such polymers, particularly the poly-N-vinyl-3-morpholinone, may be used with great benefit as dye-assisting adjuvants or additaments for various normally-difficult-to-dye synthetic, hydrophobic, polymer compositions, particularly those of the fiber-forming variety, including such acrylonitrile polymer products that are frequently used for synthetic fiber applications as polyacrylonitrile.

The invention is further illustrated in and by the examples which are intended to be demonstrative and not limiting in nature and wherein, unless otherwise specified, all parts and percentages are on a weight basis.

*Example A*

To a solution in 100 milliliters of benzene of about 40 grams of 3-morpholinone that was being maintained at a refluxing temperature of about 80° C. under a nitrogen atmosphere, there was incrementally added in small pieces over a two hour period about 6.3 grams of metallic elemental potassium. After all of the potassium metal had reacted with the 3-morpholinone to form the potassium salt thereof, an additional 313 gram quantity of 3-morpholinone was added to the reaction mass so that a total of about 353 grams (3.5 moles) of the starting material was incorporated therein. The benzene was then distilled from the reaction mass under a slight vacuum. The molten 3-morpholinone was then transferred to a 1.5 liter autoclave that was packed with Raschig rings wherein it was sealed and heated to a temperature of about 150° C. Acetylene was then admitted to capacity into the charged autoclave under a pressure of about 200 p.s.i. over a period of about ten and one-half hours, reacting therein with the starting 3-morpholinone to form N-vinyl-3-morpholinone as a product. The monomeric N-vinyl-3-morpholinone was removed from the reaction mass by distillation. About 180 grams of the monomer was thereby obtained having the precise physical characteristics described in the foregoing specification. About 145 grams of unreacted 3-morpholinone was recovered from the reaction mass. Thus, the conversion of the starting material and the yield of desired monomer product, based on recovered 3-morpholinone, were about 40.5 and 68.8 percent, respectively. The monomeric product (which theoretically contains 56.68 percent of combined carbon, 7.13 percent of combined hydrogen and 11.02 percent of combined nitrogen) was found, upon analysis, to be comprised of about 55.38 percent carbon; 6.93 percent hydrogen; and 11.18 percent nitrogen.

*Example B*

About 2 parts of N-vinyl-3-morpholinone dissolved in 8 parts of distilled water containing about 0.03 part of azobisisobutyronitrile was placed in a glass bomb wherein the mixture was purged with nitrogen and sealed. It was then heated to a temperature of about 68–72° C. and synthermally maintained thereat for a sixty-eight and one-third (68⅓) hour period. A viscous, aqueous solution of poly-N-vinyl-3-morpholinone was obtained. Upon analysis, about 99.2 percent of the starting monomer was found to have been converted to a homopolymeric product. The absolute viscosity of a 0.5 percent aqueous solution of the polymer product at 25° C. was found to be about 1.850 centipoises (relative viscosity—2.033 centipoises) indicating that the polymer product had a Fikentscher K-value of about 75.

Similar results were obtained when the foregoing procedure was substantially duplicated using aqueous solutions of the N-vinyl-3-morpholinone having concentrations from those of very dilute solutions up to about 40 percent and catalyst concentrations in the aqueous medium (based on the weight of monomer therein) between 0.05 and 1.0 percent. Substantially complete conversions of the monomer to homopolymer, some as high as 97 to 99.7 percent, were obtained in polymerization periods ranging in time from three to seventy-two hours. Polymeric products having Fikentscher K-values from 10 to 75 were thereby obtained. The homopolymer product can be recovered from the aqueous polymerization medium by precipitation therefrom upon addition thereto of methanol, ethanol, isopropanol or acetone.

Example C

About 1.0 gram of N-vinyl-3-morpholinone and 10 milligrams of azobisisobutyronitrile were mixed together and placed in a glass bomb wherein the mixture was purged with nitrogen and sealed. It was then heated at 68° C. for three hours. A homopolymeric product was obtained which was washed with ether to remove unreacted monomer and then crushed with a mortar and pestle to yield about 0.9 gram of a white powder product having an absolute viscosity at 28° C. in 0.5 percent aqueous solution of about 0.977 centipoise (relative viscosity—1.068 centipoises; K-value about 22) and characteristics and properties similar to those set forth in the foregoing specification.

Results similar to those set forth in the foregoing may be obtained when other N-vinyl-3-morpholinone monomers, including mixtures of various monomeric products, are polymerized in the above described manner to obtain polymeric N-vinyl-3-morpholinone products.

When poly-N-vinyl-3-morpholinone (as well as other of the N-vinyl-3-morpholinone polymers indicated to be within the scope of the present invention) are intimately and thoroughly incorporated in polyacrylonitrile textile fibers, the resulting product is found to have excellent acceptance of and receptivity for many of a wide variety of dyestuffs including such dyes as Calcodur Pink 2BL, a direct dyestuff having the Color Index 353; Sevron Brilliant Red 4G (formerly known as Basic Red 4G—no Color Index); Amacel Scarlet BS, an acetate dyestuff (American Prototype No. 244); Calcocid Alizarine Violet, an acid dye (Color Index 1080); and the like. Only a minor proportion of up to about 20 percent by weight, advantageously from about 1 or 2 to 15 percent, of the polymeric additive need be incorporated in the acrylonitrile polymer fiber, based on the weight of the fiber, to accomplish such beneficial result. By way of specific illustration, such benefit may be obtained by impregnating poly-N-vinyl-3-morpholinone, such as a product having a Fikentscher K-value of 75, into a polyacrylonitrile fiber that is in a water-hydrated or aquagel condition in which it contains about two parts by weight of water to each part by weight of polymer therein (as may be obtained by salt-spinning of polyacrylonitrile spinning solutions in aqueous polymer-dissolving saline solvents, all in a known manner). A 3 percent aqueous solution of the poly-N-vinyl-3-morpholinone may be employed as an impregnating bath, preferably at the boil, for the aquagel which is immersed therein for a sufficiently long period of time to become impregnated with about 10 percent by weight, based on the dry weight of the resulting poly-N-vinyl-3-morpholinone-containing fiber product. After the impregnation, the fiber product may be dried at about 150° C. for 30 minutes or so to convert it to a hydrophobic form and destroy the aquagel structure. It is then found to be easily and readily dyeable to deep and level shades of coloration with the indicated and many other dyestuffs using conventional dyeing techniques for the purpose.

What is claimed is:

1. A monomeric compound of the formula:

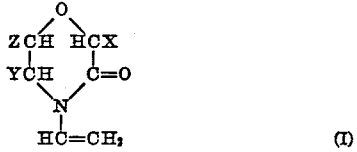

wherein X, Y and Z are each independently selected from the group consisting of hydrogen and alkyl radicals that contain from one to about four carbon atoms.

2. Monomeric N-vinyl-3-morpholinone.

3. A composition of matter comprising a high polymer having as an essential constituent of its polymeric structure material interpolymerized proportions of the recurring group:

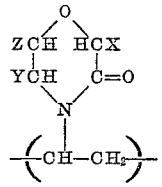

wherein X, Y and Z are each independently selected from the group consisting of hydrogen and alkyl radicals that contain from one to about four carbon atoms.

4. A high molecular weight homopolymer according to claim 3.

5. Poly-N-vinyl-3-morpholinone, characterized in being a high polymer and in having a Fikentscher K-value between about 10 and 100.

6. Method for the preparation of a polymer product having, as an essential constituent of its polymeric structure, material interpolymerized proportions of the recurring group of the Formula II

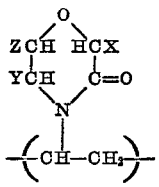

wherein X, Y and Z are each independently selected from the group consisting of hydrogen and alkyl radicals that contain from one to about four carbon atoms, which method comprises polymerizing a quantity of polymerizable monomer containing, as an essential ingredient, a material proportion of a monomer of the Formula I;

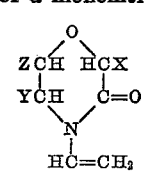

wherein X, Y and Z are as defined in the Formula II, any balance of monomer in said quantity of polymerizable monomer that is different from said monomer of the Formula I being another ethylenically unsaturated monomeric material that is interpolymerizable with said monomer of the Formula I.

7. The method of claim 6, wherein a homopolymer is prepared by polymerizing a quantity of polymerizable monomer consisting entirely of one of said monomers of said Formula I.

References Cited in the file of this patent

UNITED STATES PATENTS

| | | |
|---|---|---|
| 2,231,905 | Hanford et al. | Feb. 18, 1941 |
| 2,771,468 | Surrey | Nov. 20, 1956 |
| 2,818,362 | Drechsel | Dec. 31, 1957 |

OTHER REFERENCES

Ham: "Polymerization of Acrylics," Textile Research Journal, vol. XXIV, No. 7, July 1954, pp. 606–607. Copy in 260–88.3.

Notice of Adverse Decision in Interference

In Interference No. 92,885 involving Patent No. 2,987,509, B. E. Burgert, N-vinyl-3-morpholinone compounds, final judgment adverse to the patentee was rendered July 23, 1964, as to claims 1, 2, 6 and 7.

[*Official Gazette October 27, 1964.*]